US010479172B2

(12) United States Patent
Jabour et al.

(10) Patent No.: US 10,479,172 B2
(45) Date of Patent: Nov. 19, 2019

(54) WINDOW TINTING SYSTEM AND METHOD FOR A VEHICLE

(71) Applicant: GM GLOBAL TECHNOLOGY OPERATIONS LLC, Detroit, MI (US)

(72) Inventors: Joseph Jabour, Northville, MI (US); Michael Ames, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 161 days.

(21) Appl. No.: 15/903,311

(22) Filed: Feb. 23, 2018

(65) Prior Publication Data

US 2019/0263231 A1 Aug. 29, 2019

(51) Int. Cl.
*B60J 3/04* (2006.01)
*G02B 5/20* (2006.01)
*G02F 1/163* (2006.01)
*G02F 1/153* (2006.01)
*B60R 16/037* (2006.01)
*B60N 2/00* (2006.01)

(52) U.S. Cl.
CPC .............. *B60J 3/04* (2013.01); *B60R 16/037* (2013.01); *G02B 5/208* (2013.01); *G02F 1/153* (2013.01); *G02F 1/163* (2013.01); *B60N 2/002* (2013.01)

(58) Field of Classification Search
None
See application file for complete search history.

(56) References Cited

U.S. PATENT DOCUMENTS

| 2005/0231336 | A1* | 10/2005 | Strohband | B32B 17/10532 340/426.27 |
| 2013/0158790 | A1* | 6/2013 | McIntyre, Jr. | G02F 1/163 701/36 |
| 2018/0141414 | A1* | 5/2018 | Lota | B60J 3/04 |
| 2019/0100083 | A1* | 4/2019 | Ghannam | B60J 3/04 |
| 2019/0152303 | A1* | 5/2019 | Ghannam | B60J 3/04 |

OTHER PUBLICATIONS

Explain that Stuff!, website: "Smart" windows (electrochromic glass), Feb. 5, 2018, website: http://www.explainthatstuff.com/electrochromic-windows.html.
Wikipedia, website: Smart glass, Feb. 12, 2018, website: https://en.wikipedia.org/wiki/Smart_glass.
Smart Tint, product website: Automotive Smart Glass Film Window Tint, Feb. 5, 2018, website: http://shop.smarttint.com/Automotive-Application_b_11_html.

* cited by examiner

*Primary Examiner* — Sean Shechtman

(57) ABSTRACT

One general aspect includes a system for an activation or deactivation of one or more electrochromic windows of a vehicle, the system including: a memory configured to include one or more executable instructions; a controller configured to execute the executable instructions; a vehicle including one or more electrochromic windows, where upon receiving an activation the one or more electrochromic windows will be in a dimmed state and upon receiving a deactivation the one or more electrochromic windows will be in a transparent state; and where the executable instructions enable the controller to: receive dimming information; analyze the dimming information; based on the dimming information analysis, generate the activation or deactivation for at least one of the one or more electrochromic windows; transmit the activation or deactivation to at least one of the one or more electrochromic windows.

18 Claims, 7 Drawing Sheets

WINDOW TINTING SYSTEM AND METHOD FOR A VEHICLE

INTRODUCTION

The present disclosure relates to automated window tinting systems and methods for autonomous vehicles that may or may not be part of a rideshare system. In particular, the present disclosure relates to activating or deactivating one or more vehicle installed electrochromic "smart" windows based on impact detection, ride state, occupant detection sensors, vehicle location, and/or remote control from the backend data center.

A vehicle may include one or more generally known electrochromic "smart" windows whose light transmission properties are altered when voltage, light, or heat is applied by one or more vehicle systems. These smart windows and sunroofs are known to offer many benefits to vehicle passengers. For example, they can provide privacy, reduce unwanted light within the vehicle interior so as to reduce glare on interior displays as well as allow passengers to maintain their ability to perceive the vehicle's surrounding environment. Smart windows can also minimize heat build-up within the vehicle interior and block unwanted UV rays.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a controller, cause the controller to perform the actions. One general aspect includes a system for an activation or deactivation of one or more electrochromic windows of a vehicle, the system including: a memory configured to include one or more executable instructions; a controller configured to execute the executable instructions; a vehicle including one or more electrochromic windows, where upon receiving an activation the one or more electrochromic windows will be in a dimmed state and upon receiving a deactivation the one or more electrochromic windows will be in a transparent state; and where the executable instructions enable the controller to: receive dimming information; analyze the dimming information; based on the dimming information analysis, generate the activation or deactivation for at least one of the one or more electrochromic windows; transmit the activation or deactivation to at least one of the one or more electrochromic windows. Other embodiments of this aspect include corresponding computer systems, controllers, and computer programs recorded on one or more computer storage devices, each configured to perform the actions of the methods.

Implementations may include one or more of the following features. The system where the activation or deactivation is transmitted to the one or more electrochromic windows by way of a body control module (BCM). The system where the vehicle is an autonomous vehicle. The system where the vehicle is an electric vehicle. The system where: the vehicle further includes a thermometer configured to detect a temperature of a vehicle environment; the dimming information is, at least in part, defined by the temperature of the vehicle environment and provided by the thermometer; the controller analyzes the dimming information to determine if the temperature exceeds a threshold temperature; where the controller will generate the activation if the temperature exceeds the threshold temperature; and where the controller will generate the deactivation if the temperature falls below the threshold temperature. The system where: the vehicle further includes a seat weight sensor located in one or more vehicle seats, the seat weight sensor configured to provide vehicle seat occupancy information; the dimming information is, at least in part, defined by the vehicle seat occupancy information and provided by the seat weight sensor; where the controller analyzes the dimming information to determine whether one or more vehicle seats are adequately occupied; where the controller will generate the activation when one or more vehicle seats are occupied. The system where: the vehicle further includes one or more collision sensors, the one or more collision sensors configured to provide vehicle collision information; the dimming information is, at least in part, defined by the vehicle collision information and provided by the one or more collision sensors; where the controller analyzes the dimming information to determine whether the vehicle has adequately encountered a vehicle collision event; where the controller will generate the deactivation if the vehicle has encountered the vehicle collision event. The system further including: a data center remotely located from the vehicle; where the vehicle is further configured to wirelessly communicate with the data center; the dimming information is, at least in part, defined by a remote activation request or remote deactivation request and provided by the data center. The system may also include where the controller analyzes the dimming information to determine whether a remote activation request or remote deactivation request is present. The system may also include where the controller will generate the activation when the remote activation request is present; and where the controller will generate the deactivation when the remote deactivation request is present. The system further including: an emergency services dispatch center in communication with the data center; and where the dispatch center causes the data center to produce the dimming information that is, at least in part, defined by the remote deactivation request. The system further including: a data center remotely located from the vehicle; a tint restriction data module configured to produce window tint restriction data for a select location; where the vehicle is further configured to generate vehicle location data, the vehicle is further configured to transmit the vehicle location data to the data center; where, upon receiving the vehicle location data, the data center will: perform the tint restriction data module to identify one or more window tint restrictions at the vehicle location; based on the one or more window tint restrictions at the vehicle location, produce restriction output information; where the dimming information is, at least in part, defined by the restriction output information and provided by the data center; where the controller analyzes the dimming information to determine whether the restriction output information is present; and where the controller will generate the deactivation when the restriction output information is present. Implementations of the described techniques may include hardware, a method or process, or computer software on a computer-accessible medium.

One general aspect includes a method for an activation or deactivation of one or more electrochromic windows of a vehicle, the method including: (a) providing a memory configured to include one or more executable instructions; (b) providing a controller configured to execute the executable instructions; (c) providing a vehicle including one or more electrochromic windows, where upon receiving an activation the one or more electrochromic windows will be in a dimmed state and upon receiving a deactivation the one or more electrochromic windows will be in a transparent state; (d) receiving, at the controller, dimming information; (e) analyzing, via the controller, the dimming information; (f) based on the dimming information analysis, via the controller, generating the activation or deactivation for at least one of the one or more electrochromic windows; and (g) transmitting, via the controller, the activation or deactivation to at least one of the one or more electrochromic windows. Other embodiments of this aspect include corresponding computer systems, controllers, and computer programs recorded on one or more computer storage devices, each configured to perform the actions of the methods.

Implementations may include one or more of the following features. The method further including: where the activation or deactivation is transmitted to the one or more electrochromic windows by way of a body control module (BCM); and (h) causing, via the BCM, the activation or deactivation of the one or more electrochromic windows. The method where the vehicle is an autonomous vehicle. The method where the vehicle is an electric vehicle. The method further including: (h) providing a thermometer located at the vehicle, the thermometer configured to detect a temperature of a vehicle environment; where the dimming information is, at least in part, defined by the temperature of the vehicle environment and provided by the thermometer; where step (e) is further defined by the controller determining if the temperature exceeds or falls below a threshold temperature; where step (f) is further defined by the controller generating the activation if the temperature exceeds the threshold temperature and the controller generating the deactivation if the temperature falls below the threshold temperature. The method further including: (h) providing a seat weight sensor located in one or more vehicle seats, the seat weight sensor configured to provide vehicle seat occupancy information; where the dimming information is, at least in part, defined by the vehicle seat occupancy information and provided by the seat weight sensor; where step (e) is further defined by the controller determining whether the vehicle seat occupancy information is present; where step (f) is further defined by the controller generating the activation when one or more vehicle seats are occupied. The method further including: (h) providing one or more collision sensors located around the vehicle, the one or more collision sensors configured to provide vehicle collision information; where the dimming information is, at least in part, defined by the vehicle collision information and provided by the one or more collision sensors; where step (e) is further defined by the controller determining whether the vehicle collision information is present; where step (f) is further defined by the controller generating the deactivation if the vehicle has encountered the vehicle collision event. The method further including: (h) providing a data center remotely located from the vehicle; where the vehicle is further configured to be in communication with the data center; where the dimming information is, at least in part, defined by a remote activation request or remote deactivation request and provided by the data center; where step (e) is further defined by the controller determining whether a remote activation request or remote deactivation request is present; where step (f) is further defined by the controller generating the activation when the remote activation request is present and deactivation when the remote deactivation request is present. The method further including: (i) providing an emergency services dispatch center in communication with the data center; and (j) causing, via the emergency services dispatch center, the data center to produce the dimming information that is, at least in part, defined by the remote deactivation request. The method further including: (h) providing a data center remotely located from the vehicle; (i) providing a tint restriction data module configured to produce window tint restriction data for a select location; where the vehicle is further configured to generate vehicle location data, the vehicle is further configured to transmit the vehicle location data to the data center; (j) generating, via the vehicle, vehicle location data; (k) transmitting, via the vehicle, the vehicle location data to the data center; (l) performing the tint restriction data module to identify one or more window tint restrictions at the vehicle location and, based on the one or more window tint restrictions at the vehicle location, produce restriction output information; where the dimming information is, at least in part, defined by the restriction output information and provided by the data center; where step (e) is further defined by the controller determining whether the restriction output information is present; and where step (f) is further defined by the controller generating the deactivation when the restriction output information is present. Implementations of the described techniques may include hardware, a method or process, or computer software on a computer-accessible medium.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
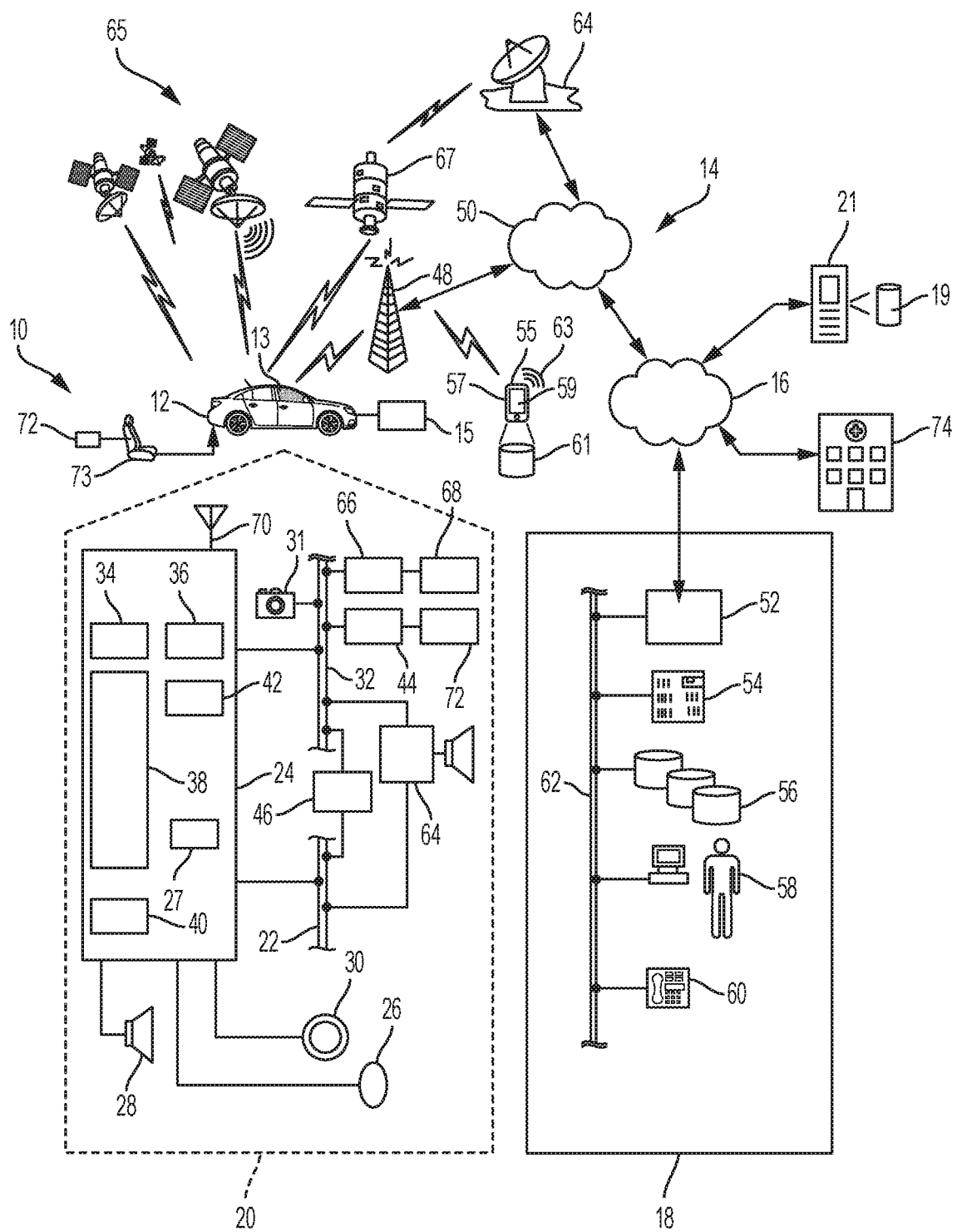
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the system disclosed herein and/or to implement examples of the methods disclosed herein. Communication system 10 generally includes one or more vehicles 12 (shown as one), a wireless carrier system 14, a land network 16, a data center 18 (i.e., the backend), emergency dispatch center 74, and a module server 21. It should be appreciated that the overall architecture, setup and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Vehicle 12 may be any type of user operated or autonomous vehicle (discussed below) such as a motorcycle, car, truck, bicycle, recreational vehicle (RV), boat, plane, etc., and is equipped with suitable hardware and software that enables it to communicate over communication system 10. Vehicle 12 may include a power train system with multiple generally known torque-generating devices including, for example, an engine 15. In certain embodiments, engine 15 can be an internal combustion engine that uses one or more cylinders to combust fuel, such as gasoline, in order to propel vehicle 12. In one or more alternative embodiments, however, the power train system can include numerous electric motors or traction motors that convert electrical energy into mechanical energy for propulsion of vehicle 12 (discussed below). Skilled artists will also see engine 15 can be a compression-ignition engine which uses a combustion chamber to combust fuel, such as diesel fuel, compressed natural gas, or propane.

Some of the fundamental vehicle hardware 20 for each fleet vehicle is shown generally in FIG. 1 including a telematics unit 24, a microphone 26, speaker 28, buttons and/or controls 30 connected to telematics unit 24, and one or more interior cameras 31. Operatively coupled to telematics unit 24 is a network connection or vehicle bus 32. Examples of suitable network connections include a controller area network (CAN), a media oriented system transfer (MOST), a local interconnection network (LIN), an Ethernet, dedicated short-range communications channel (DSRC), and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communications with the data center 18, and generally includes an electronic processing device 38, one or more types of electronic memory 40, a cellular chipset/component 34, wireless modem 36, dual mode antenna 70, and navigation unit containing a GPS chipset/component 42 capable of communicating vehicle location information via a GPS satellite system 65. GPS component 42 thus receives coordinate signals from a constellation of GPS satellites 65. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS component 42), or some or all navigation services can be done via telematics unit 24, wherein the location coordinate information (vehicle location data) is sent to a remote location for purposes of providing the vehicle with navigation maps, map annotations, route calculations, and the like.

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware 20 also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services. The vehicle hardware even further includes one or more interior cameras 31 used to scan the vehicle interior and detect objects. For example, interior camera 31 may be located on the dashboard and directed at one or more of the vehicle seats 73 and enabled to view and identify when a vehicle passenger is seated in their respective vehicle seat 73.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout each fleet vehicle and use the sensed input to perform diagnostic, monitoring, control, reporting and/or other functions. One example of a vehicle sensor 72 is a seat weight sensor located in one or more of the vehicle seats 73 configured to detect vehicle seat occupancy by determining when a vehicle occupant is seated. The seat weight sensor can be a pressure sensor embodied as a silicone-filled "bladder" which signals the downward pressure of an occupant's weight upon being seated on the vehicle seat 73 and can indicate the amount of downward pressure being asserted. Another example of a vehicle sensor 72 is a thermometer (exterior temperature gauge) located on the body of vehicle 12 and configured to detect the temperature in the environment surrounding vehicle 12.

Each of the VSMs 44 is preferably connected by vehicle bus 32 to other VSMs 44, as well as to telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) feature that provides myriad real-time system function data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. Another VSM 44 can be a body control module (BCM) that monitors and governs various electrical components located throughout the vehicle body like the vehicle's power door locks, air conditioner, tire pressure, lighting system, engine ignition, vehicle seat adjustment and heating, mirrors, headlights, and a plurality of smart windows 13. Furthermore, as can be appreciated by skilled artisans, the above-mentioned VSMs are only examples of some of the modules that may be used the vehicles 12, as numerous others are also possible.

The smart windows 13 are known to be made of electrochromic glass configured to produce a dimming effect across the window pane upon a command so as to reduce thermal rays and glare from entering into the vehicle interior, filter UV rays from entering the vehicle interior, create privacy for vehicle occupants, or otherwise decorate vehicle 12. For example, when enabled by the application of electric voltage from BCM 44, the pane of smart window 13 will transition from being clear to tinted, opaque, or mirror like or the smart window 13 will quickly change color (e.g., transition from a yellow hue to a brown hue). Conversely, electric voltage can also be removed from smart window 13 so the pane returns to being transparent or voltage can be removed in certain increments so that the window pane can transition from a deeper dimmed state to a lighter dimmed state (e.g., 70% tinted to 30% tinted or from a brown hue to yellow hue). Skilled artists will understand that smart windows 13 are also commonly known as "switchable windows", "smart glass", and "dynamic windows." It should be understood that, in one or more embodiments of vehicle 12, the smart windows 13 can be wired directly to telematics unit 24 so that the telematics unit 24 may activate or deactivate each smart window 13.

A passive entry passive start (PEPS) module, for instance, can be another of the numerous of VSMs and provides passive detection of the absence or presence of a passive physical key or a virtual vehicle key. When the passive physical key approaches, the PEPS module can determine if the passive physical key is authentic as belonging to the vehicle. The PEPS can likewise use authentication information received from data center 18 to determine if a mobile computing device 57 with virtual vehicle key is authorized/authentic to vehicle. When the virtual vehicle key is deemed authentic, the PEPS can send a command to BCM 44 permitting access to its vehicle. It should be understood that the PEPS may be an electronic hardware component connected to the vehicle bus 32 or, in an alternative embodiment, may be one or more software code segments uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with remote locations (e.g., data center 18), digital camera 55, user interface 59, mobile memory 61 to store one or more databases, and/or GPS module 63 capable of receiving GPS satellite signals and generating GPS coordinates based on those signals. User interface 59 may be embodied as a touch-screen graphical interface capable of user interaction as well as exhibiting information. Digital camera 55 may include the ability to generate bitmapped data representations of captured tangible-object images through generally known operations. Examples of the mobile computing device 57 include the iPhone™ and Apple Watch™ each being manufactured by Apple, Inc. and the Droid™ smart phone manufactured by Motorola, Inc. as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 24 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate how virtual key fob pairing can occur—upon receiving a request, data center 18 will generate an encrypted virtual vehicle key to permit vehicle access via mobile computing device 57. Data center 18 will then transmit aspects of this encrypted virtual vehicle key information to both mobile computing device 57 and the PEPS module 44 via telematics unit 24. After pairing has been established, mobile computing device 57 will send its virtual vehicle key aspect to telematics unit 24 for recognition in light of its stored corresponding virtual key aspect and in turn the PEPS may establish mobile computing device 57 as the acting key fob for the vehicle. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58 as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 56, telematics unit 24, and mobile computing device 57. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Database 56 could be designed to store information in the form of executable instructions such as, but not limited to, numerous application program interface (API) suites. Moreover, in certain instances, these API suites may be accessible to the system user, data center 18, or one or more third parties. As examples, one API suite can be a rideshare services suite that incorporates numerous rideshare system records (i.e., vehicle reservation information) each having information related to the vehicle 12 such as, but not limited to, rideshare vehicle records (e.g., vehicle VSM information), information related to the user such as, but not limited to, reservation account records (e.g., vehicle comfort settings information, telematics unit settings, or vehicle make-model preferences), information related to organizing vehicle reservations such as, but not limited to, reservation profile records (e.g., reservation calendar information, vehicle assignment information, third party contact information, etc.), and information related to fleet management (e.g., fleet vehicle feedback data, localization and mapping data, path planning feedback data, etc.), or any other pertinent rideshare system information. The records can moreover be copied, organized, and/or stored in a tabular form that allows for continuous, real-time updates. The records can additionally collaborate with a reservation account (discussed below) for support of, for example, reservation management.

The user of mobile computing device 57 may create their own personalized vehicle reservation account to be stored in mobile memory 61 and which may have access to the rideshare records at the backend. The user may perform tasks to create this account through a variety of frontend devices such as, for example, through a remote computer and mobile computing device 57. This reservation account may be uploaded to or accessible on server 54 (i.e., to support backend functions). Data center 18 may also access one or more additional remote servers 21 and/or remote databases (e.g., Department of Motor Vehicles, weather databases, traffic databases, etc.) to receive information in support of establishing the reservation account as well as a particular reservation and one or more rideshare system records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account as a software module therefrom. The reservation account may moreover include one or more prompts to instruct the user to provide information (e.g., validating data) to support account creation.

Reservation account may also provide one or more prompts to assist a rideshare system user in reserving a personal transportation vehicle by operatively accessing and communicating with the backend rideshare system records (for the purposes of obtaining transportation to certain destinations). Once a reservation is made, mobile computing device 57 will transmit this reservation information to one or more of the rideshare records for updates thereto. At the backend, server 54 will collaborate with database 56 and one or more of the rideshare system records to establish a subset of the fleet available for reservation.

To illustrate, for example, in one or more embodiments of communications system 10, server 54 can manage the use of a fleet of twenty (20) vehicles in a particular geographic location and determine that ten (10) of those vehicles are available to carry out the requested rideshare reservation. Server 54 will then, for example, select one of those fleet vehicles using a vehicle identifier and assign that identifier to the reservation account and corresponding rideshare records for use during the requested reservation. Server 54 then communicates provided pickup coordinates and drop off coordinates to the selected fleet vehicle via its telematics unit 24 so the vehicle can direct itself to the user, pick the user up, and then drop the user off at a designated location. As vehicles are requested and used, server 54 can determine the identities of the vehicles currently in use and monitor various aspects of the other fleet vehicles so as to understand which vehicles are available at any particular time. This monitoring process may thus be conducted through review of one or more rideshare records.

Module server 21 can be one of a number of computers accessible via a private or public network such as the Internet. Each such computer 21 can be used for one or more purposes, such as processing a tint restriction data module 19 configured to produce window tint restriction data at one or more selected vehicle locations (discussed below). Other such accessible computers 21 can be, for example a third-party repository to or from which vehicle data or other information is provided, whether by communicating with the vehicle 12 or data center 18, or both.

Emergency services dispatch center 74 is a professional telecommunicator which is tasked with, amongst other things, the gathering of information related to medical emergencies and the dispatching and support of emergency medical services (EMS) responders. An example of dispatch center 74 is a 9-1-1 call center. Dispatch center 74 can also make one or more emergency requests to data center 18, as is generally known.

Electric Vehicle Aspects

Figure 2:
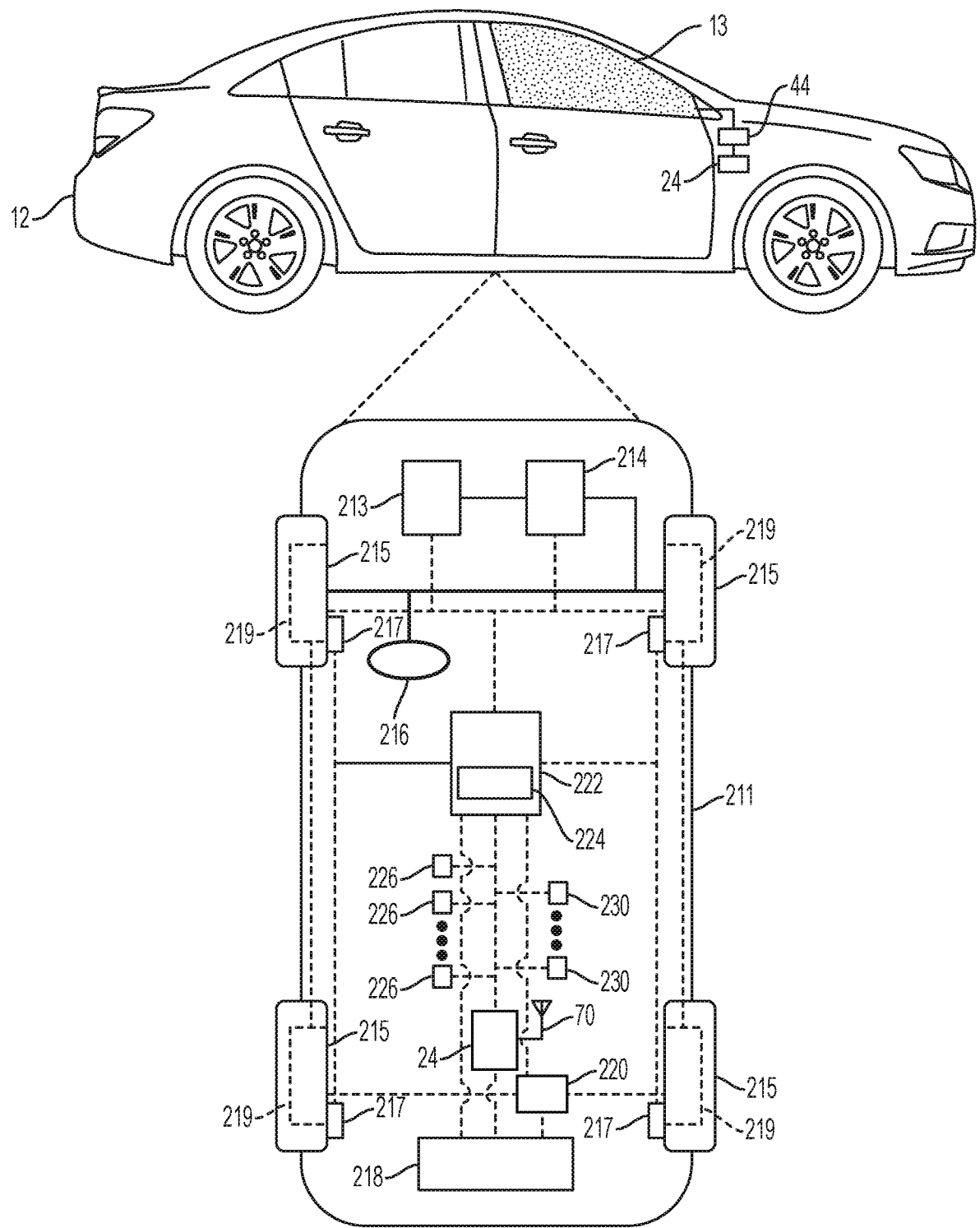
FIG. 2 is a schematic diagram of an autonomously controlled electric vehicle, according to an embodiment of the communications system of FIG. 1.

With reference to FIG. 2, in one or more embodiments, vehicle 12 can be an electric vehicle (EV) that generally includes vehicle wheels 215 which rotatably support a vehicle body 211. Vehicle 12 can further include a propulsion system 213 with at least one electric motor 219. An electric motor 219 is operatively connected to each of the vehicle wheels 215 to transmit torque thereto, and thereby propels the vehicle 12. These motors may moreover, in one or more embodiments, be directly or indirectly connected to their corresponding wheel via a transmission 214 (shown as a direct connection configuration). It should be understood that vehicle 12 may also be embodied as an extended range electric vehicle (EREV) or hybrid vehicle (combining an internal combustion engine with one or more electric motors).

Propulsion system 213 can also include a power source 218 embodied as a battery for the purpose of providing direct-current (DC) electricity to power each of the motors, as well as other vehicle systems. Each motor may be a permanent-magnet motor, induction motor, or any type of motor that uses alternating current (AC) electricity. Consequently, propulsion system 213 can include an inverter aspect 220 operatively connected to the power source output so as to allow the DC current to be converted into AC current before being supplied to the motors. Propulsion system 213 may additionally be connected to a vehicle controls device 222, discussed below, to regulate the amount of transmitted energy from power source 218 so as to effectively control the torque output from each motor 219. Propulsion system 213 may further include an input component, which in some embodiments can be operable by a human (i.e., a selectively depressible foot pedal), to provide for an input of a desired torque output. Propulsion system 213 may moreover be connected to vehicle bus 32 to communicate with one or more VSMs 44 (not shown). For example, OBD 44 may provide State of Charge (SoC) information for power source 218 based on information received from one or more power reading sensors.

While depicted as a single unit for illustrative purposes, vehicle controls device 222 may additionally include one or more other controllers, collectively referred to as a "controls device" or "vehicle controls device." Controls device 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controls device 222 in controlling the vehicle.

Autonomous Vehicle Aspects

In addition to the vehicle aspects discussed above, in one or more embodiments, vehicle 12 can be an autonomous vehicle. In those embodiments in which vehicle 12 is an autonomous vehicle, a transmission 214 may be installed to transmit power from propulsion system 213 to vehicle wheels 215 according to selectable speed ratios. According to various embodiments, transmission 214 may include a step-ratio automatic transmission, a continuously-variable transmission, or other appropriate transmission. Vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. It should be understood transmission 214 does not necessarily need to be installed for propulsion system 213 to propel vehicle 12.

Vehicle 12 additionally includes a steering system 216. While depicted as including a steering wheel for illustrative purposes, in some contemplated embodiments, the steering system 216 may not include a steering wheel. Telematics unit 24 is additionally configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, this communication system communicates via at least one dedicated short-range communications (DSRC) channel. DSRC channels refer to one-way or two-way short-range to medium-range wireless communication channels specifically designed for automotive use and a corresponding set of protocols and standards.

The propulsion system 213 (explained above), transmission 214, steering system 216, and wheel brakes 217 are in communication with or under controls device 222. Vehicle controls device 222 includes an automated driving system (ADS) 224 for automatically controlling various actuators in the vehicle. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, motors 219, steering system 216, and wheel brakes 217 to control vehicle acceleration, steering, and braking, respectively, without human intervention via a plurality of actuators 230 in response to inputs from a plurality of driving sensors 226, which may include GPS, RADAR, LIDAR, optical cameras, thermal cameras, ultrasonic sensors, and/or additional sensors as appropriate.

Figure 3:
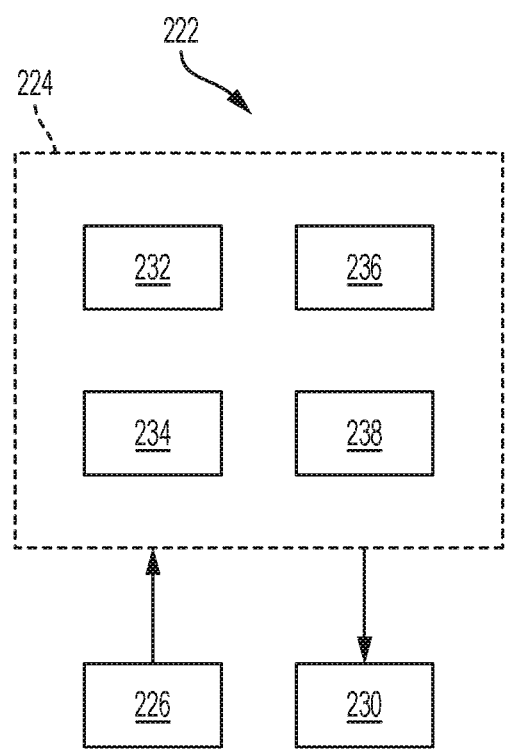
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, lidars, radars, and/or any number of other types of sensors. In one or more exemplary embodiments described herein, the sensor fusion system 232 supports or otherwise performs the ground reference determination processes and correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 232 provided to the vehicle control system 238 (e.g., indicia of detected objects and/or their locations relative to the vehicle 12) reflects or is otherwise influenced by the calibrations and associations between camera images, lidar point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the vehicle controls device 222 implements machine learning techniques to assist the functionality of the vehicle controls device 222, such as feature detection/classification, obstruction mitigation, route traversal, mapping, sensor integration, ground-truth determination, and the like.

The output of vehicle controls device 222 is communicated to actuators 230. In an exemplary embodiment, the actuators 230 include a steering control, a shifter control, a throttle control, and a brake control. The steering control may, for example, control a steering system 216 as illustrated in FIG. 2. The shifter control may, for example, control a transmission 214 as illustrated in FIG. 2. The throttle control may, for example, control a propulsion system 213 as illustrated in FIG. 2. The brake control may, for example, control wheel brakes 217 as illustrated in FIG. 2.

Window Tint Restriction Data Module

Figure 4:
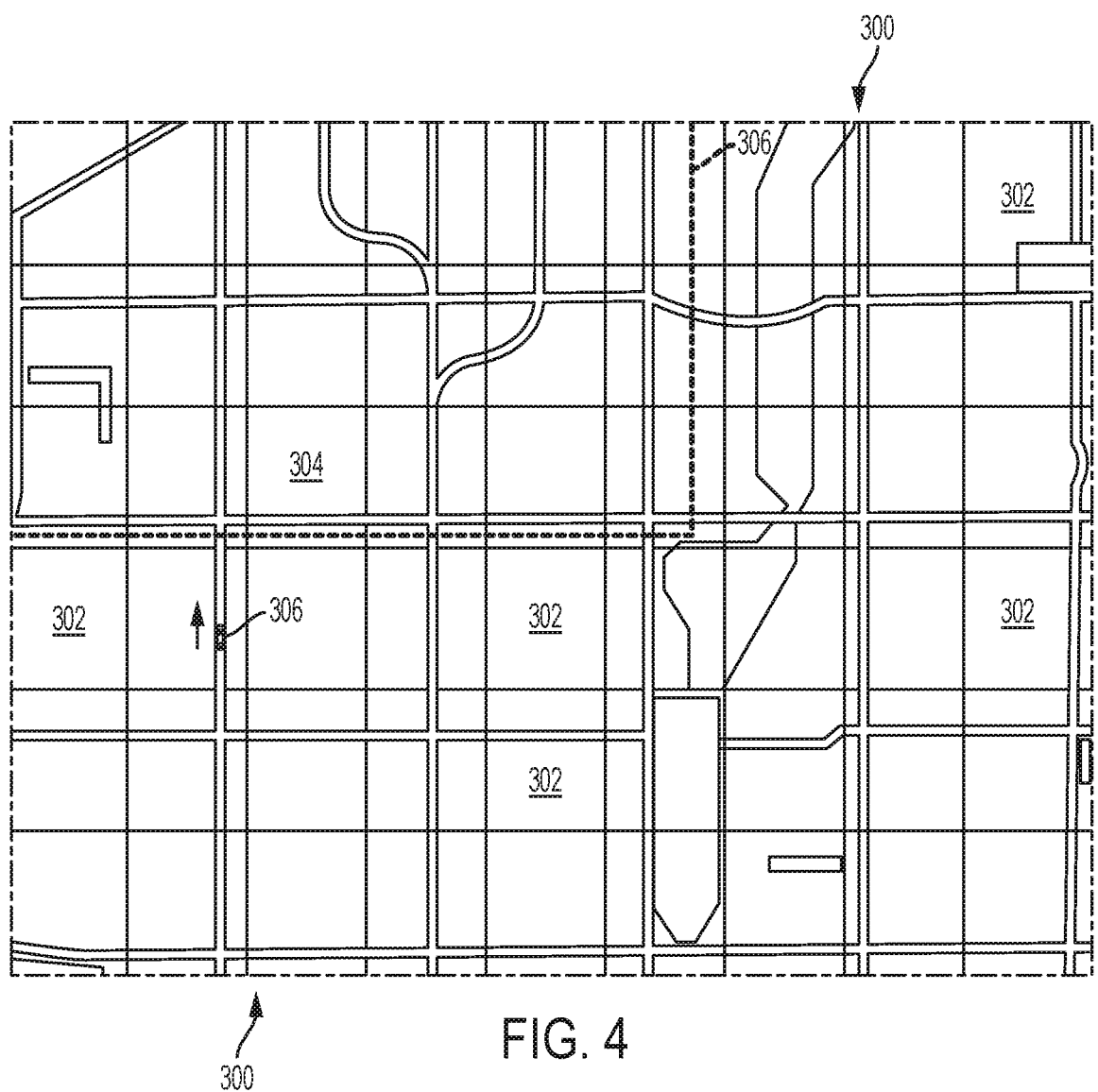
FIG. 4 represents broad aspects of an exemplary map illustrating a performance of a tint restriction data module.

As can be understood with reference to FIG. 4, tint restriction data module 19 includes a mapping engine code segment. Mapping engine receives and serves map requests from and on behalf of data center server 54. For example, in response to a request to provide a map of given GPS coordinates, mapping engine also retrieves the required information from one or more databases in module server 21, and then filters and formats the map data in suitable form for provision to data center server 54. In one or more embodiments, data module 19 may also include a search engine code segment to receive and serve requests from the data center server 54 to locate a certain geographical feature for the map such as, but not limited to, city/town limits 306, streets, window tint restriction information, building addresses, and Point of Interest information. In certain instances, module server 21 may correspondingly use data from a third-party service provider (not shown) to support production of a map data output. The restriction output of data module 19 may be compressed into a binary form, to minimize the bandwidth consumed by transmission of the data from module server 21 to data center server 54. This transmitted data may further be encrypted for purposes of data security.

To operate data module 19, in a first objective step, transmitted location data would arrive at module server 21; this location data includes tracked, demodulated GPS coordinates that have been generated from GPS component 42. In another objective step, data module 19 would receive the location data (e.g., via server 54) and subsequently provide the data as a map request to mapping engine. In another objective step, mapping engine would then retrieve the required information from the module server databases, and then filter and format the map data in a suitable form. When incorporated, in an optional objective step, the search engine would locate and retrieve certain geographical features for this map data. Search engine could additionally correspond with a third-party service provider to receive more accurate map data (e.g., dynamic data) and subsequently compile and analyze this third-party data. In another objective step, data module 19 combines the data processed, compiled, and received from mapping engine (and search engine) to construct the map data as an accurate map 300 that includes one or more geographic areas having vehicle window tint restrictions.

As illustrated, the constructed map 300 includes a living canvas of high definition, three-dimensional topographical data having multiple data coordinates 302 to create a virtual environment of mapping data that corresponds to the real-life environment. Map 300 also includes at least one area of tint restrictions 304 that may, for example, correspond to a jurisdiction such as a town or city (which may be received from the third-party service provider). As shown, the tint restriction area is laid over a portion of map 300 to designate the window tint restriction of that specific area.

In another objective step, data module 19 will determine if the input places the vehicle location 308 in an area of window tint restrictions. If the vehicle location 308 reflects restrictions are applied to this location, in a proper data format (binary code format), data module 19 will provide to data center 18 a restriction output that establishes the vehicle is currently in one of the restricted areas 304 and which may be adapted to be further processed by telematics unit 24. Skilled artisans will see that this data may further include a visualization aspect to allow the data to be exhibited on a display such as, but not limited to, the display of telematics unit 24. If the vehicle location 308 reflects restrictions are applied to this location, however, data module 19 will not provide the restriction output or it will provide an output which establishes the vehicle location is free of window tint restrictions.

Methods

As at least partially explained above, rideshare systems, which may be used in one or more embodiments of the methods discussed below, are those systems which allows a user (rideshare system user) to download the reservation account to mobile computing device 57 and then register their reservation account by providing personal and/or payment information. The user may then use the rideshare system to request a ride from an autonomous-electric vehicle (discussed above) within a certain proximity of their location (e.g., 5-10 miles). Once confirmed, the reservation account may, for example, exhibit the vehicle's name and type, feedback/ratings from one or more previous users, and images of the requested vehicle. During the window of rideshare system services operation, the delegated vehicle will autonomously traverse to the user's location, pick the user up, autonomously taxi the user to their selected destination, and then drop the user off at the selected destination location. After the rideshare services are complete, the user may be provided an opportunity to submit their own feedback/rating of one or more of the rideshare system services. The vehicle may moreover autonomously traverse to the next request, a parking location, or a vehicle charge station (i.e., each of which would complete the rideshare system task).

Turning now to FIGS. 5-9, there can be seen applications of various methods for an activation or deactivation of at least one smart window 13 (discussed above). Aspects of this method may be executed through electronic processing device 38 (i.e., controller), for example, to activate smart window 13 to be in a dimmed state (i.e., tinted) or deactivate smart window 13 to be transparent. Electronic processing device 38 may moreover directly activate/deactivate smart window 13 or electronic processing device 38 may indirectly activate/deactivate smart window 13 via BCM 44. Peripheral aspects may, in one or more embodiments, be executed through controls device 222 of an autonomous version of vehicle 12, for example, to implement the generated instructions and cause the vehicle to properly traverse the generated route and optimally perform their rideshare system task. Peripheral aspects may also, in one or more embodiments, incorporate vehicle 12 as being an electric vehicle or an electric-autonomous vehicle.

Figure 5:
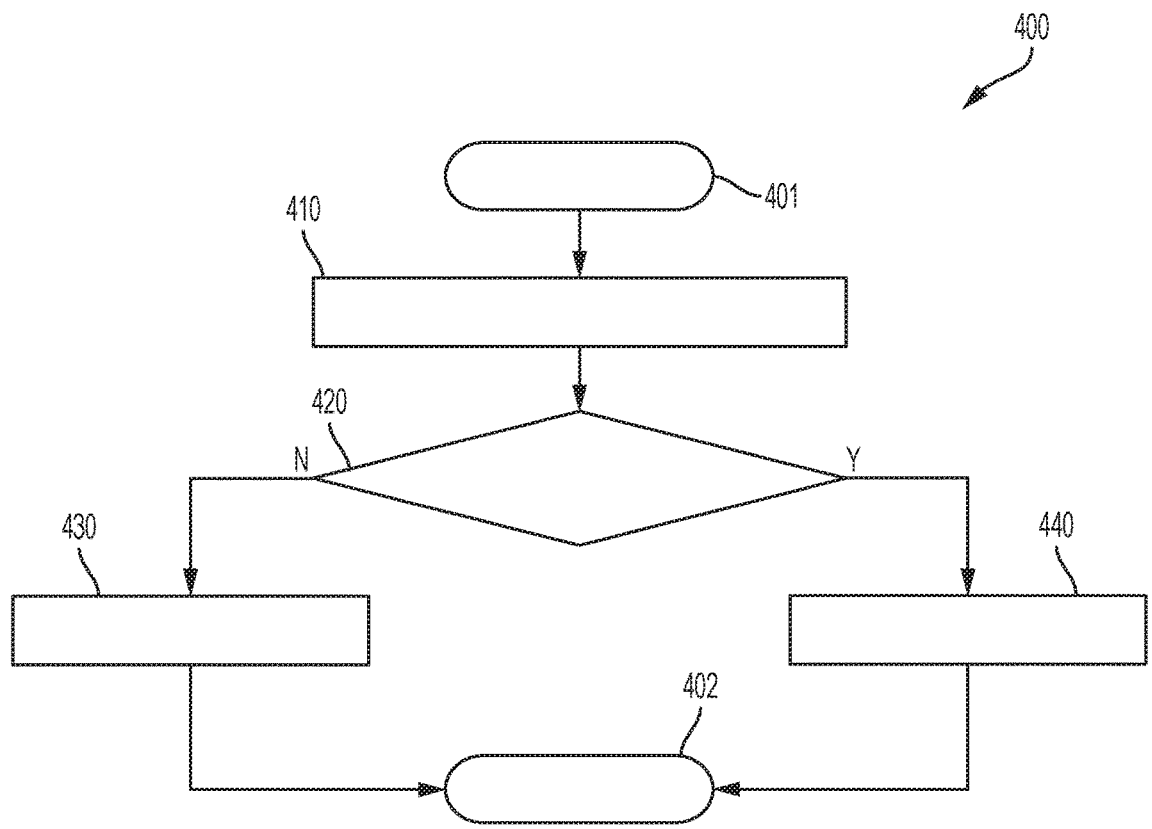
FIG. 5 is a flow chart for an exemplary methodology for activation or deactivation of one or more electrochromic "smart" windows of the vehicle of FIG. 2.

With reference to FIG. 5, method 400 is directed to the activation/deactivation of smart windows 13 due to the temperature in the environment surrounding vehicle 12, for the purposes of reducing heat in the vehicle cabin. Method 400 begins at 401 with one or more smart windows being in either the activated or deactivated state. In step 410, the thermometer 72 (exterior temperature gauge) installed on the vehicle body will detect the temperature in the environment directly surrounding vehicle 12. Upon a proper reading, thermometer 72 will also transmit this temperature indication to electronic processing device 38 (i.e., as dimming information designed to assist processing device 38 in making a decision on whether one or more of the vehicle-installed smart windows 13 should be activated or deactivated). Skilled artisans will see that the dimming information can be a data stream provided to processing device 38, for example, along vehicle bus 32, which can, under certain circumstances, include one or more component readings that allows processing device 38 to determine when to activate/deactivate one or more smart windows 13.

In step 420, electronic processing device 38 will receive and analyze the temperature (i.e., emanating as a reading from thermometer 72 and transmitted to processing device 38 as at least part of the dimming information transmissions). In this step, processing device 38 will also determine whether the temperature reading exceeds (i.e., rises above) or falls below a predetermined threshold temperature. This determination, in one or more embodiments, may be made in light of one or more previously made temperature readings (which may be transmitted at predetermined times/events occurring throughout the day). Thus, in one or more embodiments, a temperature would exceed the threshold temperature when a previously made temperature reading was found to be below the threshold temperature and the current reading is above the threshold temperature. Similarly, a temperature would fall below the threshold temperature when a previously made temperature reading was found to be above the threshold temperature and the current reading is below the threshold temperature. The threshold temperature, for example, can be stored in electronic memory 40 and may be set to be a temperature deemed as one which could create unwanted and burdensome heating within the vehicle interior. For instance, the threshold temperature could be set at 85 degrees, since that is a temperature which would likely cause the vehicle interior to become unduly hot. Moreover, if processing device 38 determines the received temperature reading exceeds the threshold temperature, then method 400 will move to step 430; otherwise, method 400 will move to step 440.

In step 430, processing device 38 will generate an activation command to smart window 13. Processing device 38 will then transmit the activation command to smart window 13, which can be directly or by way of BCM 44. As can be understood, the received activation command causes smart window 13 to fully activate from a deactivated state and in turn create the dimming effect. In essence, an electric voltage is sent to the window 13 to cause the glass to become tinted, mirrored, opaque, or have some other known dimming effect. Processing device 38 will also allow smart window 13 to remain active until deactivation is required (e.g., when the environmental temperature reading falls below the threshold temperature). After step 430, method 400 will move to completion 402. In step 440, processing device 38 will generate a deactivation command to smart window 13. Processing device 38 will then transmit the deactivation command to smart window 13 (e.g., via BCM 44). As can be understood, the deactivation command causes smart window 13 to deactivate from an activated state and in turn stop electric voltage from being sent to the window 13, causing the window to become transparent. After step 440, method 400 will move to completion 402. After completion 402, method 400 may begin again after some time duration, a predetermined time, or a predetermined event.

Figure 6:
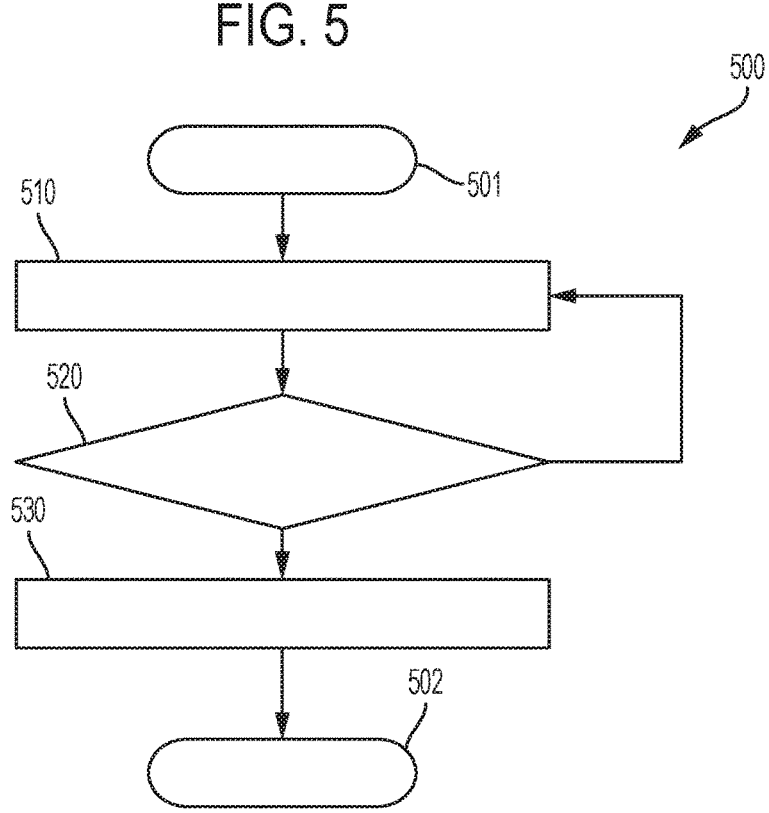
FIG. 6 is a flow chart for an exemplary methodology for activation or deactivation of one or more smart windows of the vehicle of FIG. 2.

With reference to FIG. 6, method 500 is directed to the activation of one or more smart windows 13 due to a vehicle passenger occupying a vehicle seat 73. Method 500 begins at 501 with one or more smart windows being in the deactivated state. In step 510, at least one of the seat weight sensors 72 embedded in the vehicle seats 73 will detect that a vehicle occupant is seated on the seat (e.g., seat cushion). Upon a proper detection, at least one seat sensor 72 will also transmit this seat occupancy indication, which may or may not correspond to the particular seat 73, to electronic processing device 38 (i.e., as at least part of the dimming information). In step 520, electronic processing device 38 will receive and analyze the dimming information to determine that the vehicle seat occupancy information is present. In this step, processing device 38 may also additionally determine whether the seat occupancy information indicates that a human is occupying at least one of the seats as opposed to some other object (e.g., books, groceries, laundry, etc.). If processing device 38 determines the received seat occupancy information indicates that a human is occupying at least one of the seats, then method 500 will move to step 530; otherwise, method 500 will move to the method beginning 501. In step 530, processing device 38 will generate an activation command to smart window 13. Processing device 38 will then transmit the activation command to smart window 13, which can be directly or by way of BCM 44. In one or more embodiments, processing device 38 may transmit the command to be adapted to activate only the smart window 13 that corresponds to the seat 73 in which seat weight sensor 72 has been indicating seat occupancy. In one or more alternative embodiments, processing device 38 will transmit the command to be adapted to activate all installed smart windows 13. It should be understood, upon the vehicle passengers leaving vehicle 12, processing device 38 may be configured to automatically generate and transmit a deactivation command to the smart windows 13. It should also be understood that, one or more embodiments, seat occupancy information may be produced by interior camera 31. In such embodiments, camera 31 will scan the seats, identify any objects, and produce seat occupancy information when a scanned object reflects a passenger is located in the seat 37.

Figure 7:
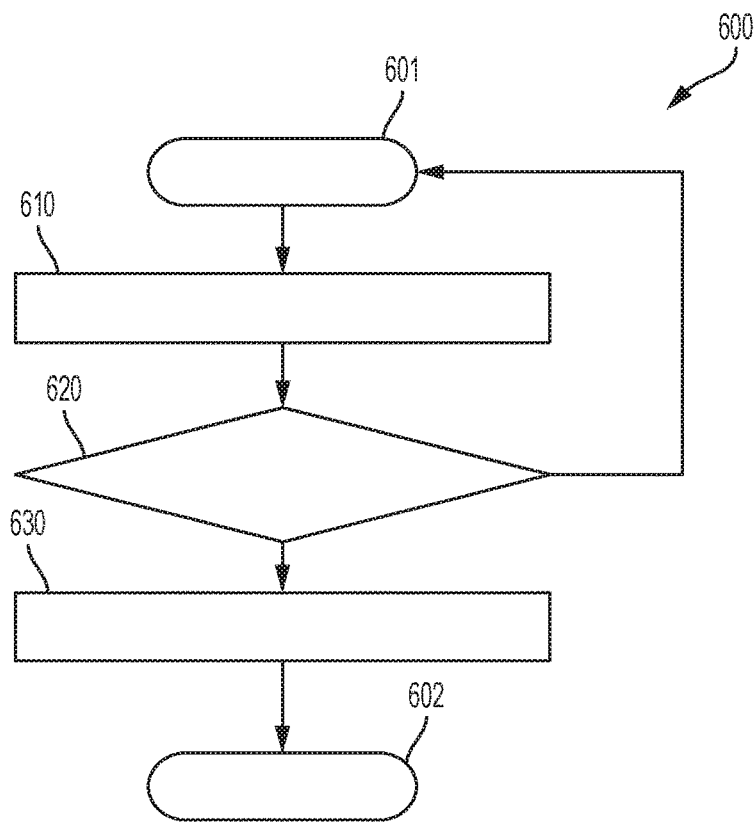
FIG. 7 is a flow chart for an exemplary methodology for activation or deactivation of one or more smart windows of the vehicle of FIG. 2.

With reference to FIG. 7, method 600 is directed to the deactivation of one or more smart windows 13 due to a vehicle collision. Method 600 begins at 601 with one or more smart windows being in the activated state. In step 610, at least one of the collision sensors 68 embedded located around vehicle 12 will detect that the vehicle 12 has encountered a vehicle collision event (a severe impact between vehicle 12 and an object such as a street sign, building, boulder or a severe impact between vehicle 12 and another vehicle). Upon a proper detection, at least one of the collision sensors 68 will also transmit this vehicle collision indication to electronic processing device 38 (i.e., as at least part of the dimming information). In step 620, electronic processing device 38 will receive and analyze the dimming information to determine if vehicle collision information is present. In this step, processing device 38 may also additionally determine whether the vehicle collision information indicates that the collision event is one in which the smart windows 13 should become transparent. For example, the collision event is not based on a faulty sensor reading or minor impact created by flying miniature road debris (e.g., pebbles). If processing device 38 determines the collision information indicates that vehicle 12 has been severely impacted by another vehicle/object, then method 600 will move to step 630; otherwise, method 600 will move to the beginning 601. In step 630, processing device 38 will generate a deactivation command to smart window 13. Processing device 38 will then transmit the deactivation command to each of the smart windows 13, which can be directly or by way of BCM 44. Method 600 will then move to completion 602.

Figure 8:
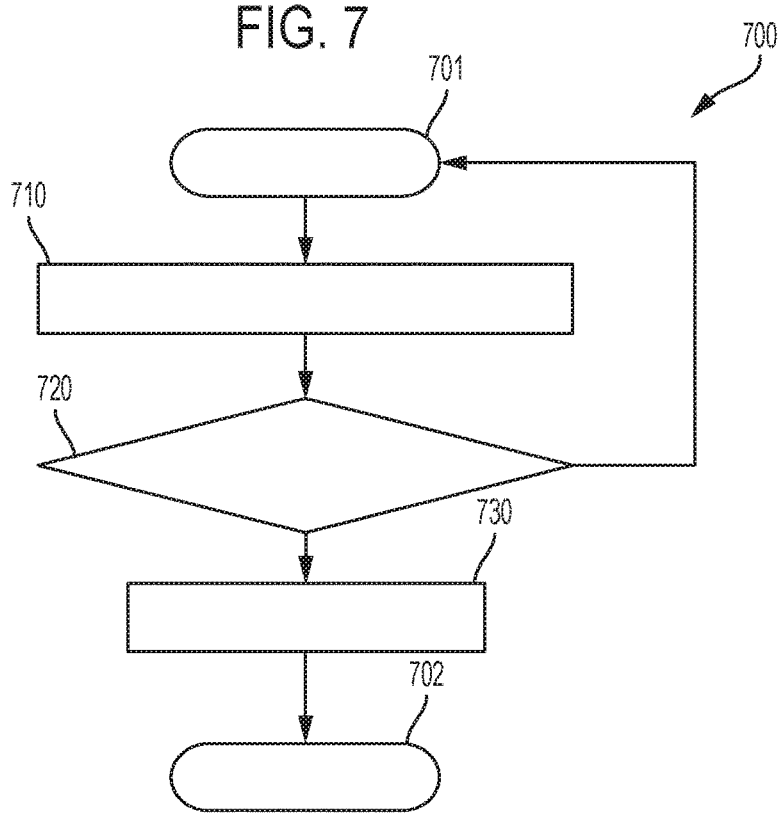
FIG. 8 is a flow chart for an exemplary methodology for activation or deactivation of one or more smart windows of the vehicle of FIG. 2.

With reference to FIG. 8, method 700 is directed to instances of activation or deactivation requested by data center 18. Method 700 begins at 701 with one or more smart windows being in either the activated state or deactivated state. In step 710, data center 18 produces and transmits remote activation or remote deactivation request. Both requests may be produced by live advisor 58 or server 54. A remote activation request can be produced and transmitted by data center 18 after one or more vehicle passengers calls data center 18 to request remote activation for one or more reasons (e.g., personal or emergency). Conversely, a remote deactivation request can be produced and transmitted by data center 18 after one or more vehicle passengers calls data center 18 to request remote deactivation for one or more reasons (e.g., personal or emergency). In emergency situations, in one or more embodiments, subject to local laws, emergency services dispatch center 74 can also command data center 18 to produce and transmit the remote deactivation request so as to ensure smart windows 13 are transparent when one or more EMS responders arrive at vehicle 12. Skilled artisans will also see that, subject to local laws, in one or more embodiments, emergency services dispatch center 74 may have the ability to directly transmit a deactivation request directly to vehicle 12 (e.g., via telematics unit 24).

In step 720, electronic processing device 38 will receive and analyze the dimming information to determine whether a remote activation request or remote deactivation request is present and if so, which type is present. Moreover, if processing device 38 determines a remote activation request or remote deactivation request is present in, at least part of, the dimming information, then method 700 will move to step 730. Method 700 will otherwise move to beginning 701.

In step 730, processing device 38 will generate an activation command to smart window 13 if a remote activation request is present or will generate a deactivation command to smart window 13 if a remote deactivation request is present. Processing device 38 will then transmit the activation/deactivation command to smart windows 13, which can be directly or by way of BCM 44. Processing device 38 will also allow smart windows 13 to remain activated or deactivated until the alternative state is required for one or more reasons. After step 730, method 700 will move to completion 702.

Figure 9:
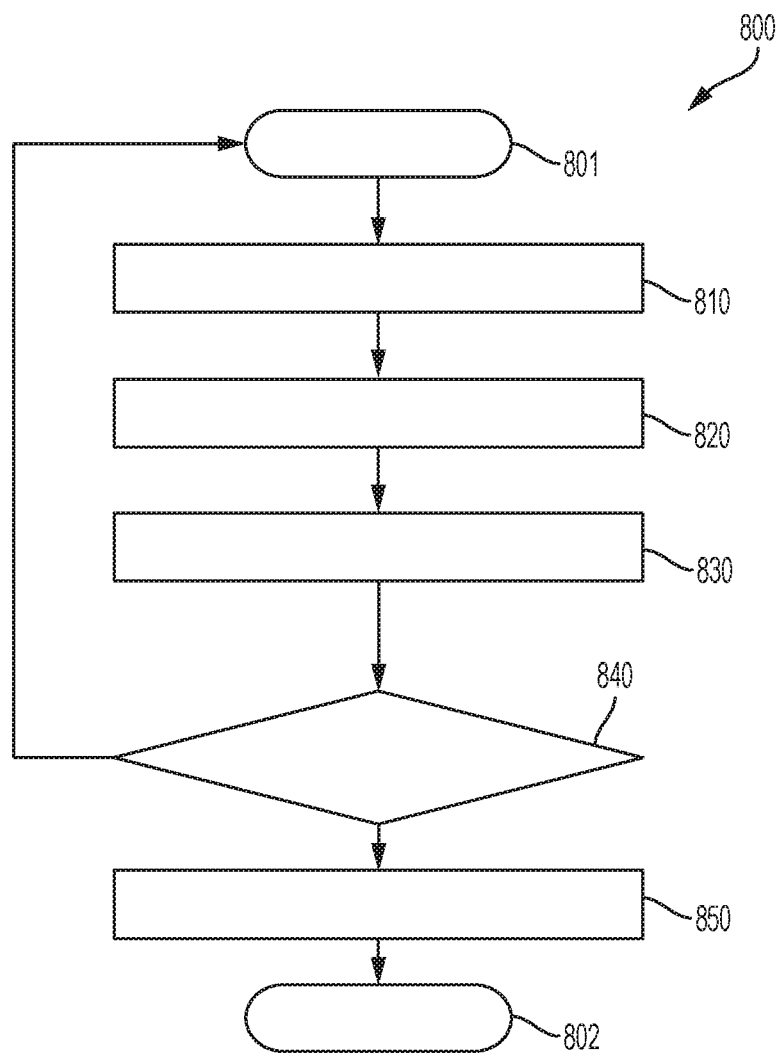
FIG. 9 is a flow chart for an exemplary methodology for activation or deactivation of one or more smart windows of the vehicle of FIG. 2.

With reference to FIG. 9, subject to local laws, method 800 can be directed to instances of activation or deactivation requested by data center 18 based on the window tint restrictions at the location of vehicle 12. Method 700 begins at 701 with one or more smart windows being in the activated state. In step 710, in one or more embodiments, vehicle 12 implements GPS chipset/component 42 to generate and transmit its vehicle location to data center 18 (i.e., via telematics unit 24). In one or more embodiments, when vehicle 12 is an autonomous vehicle, vehicle 12 can additionally implement driving sensors 226 (e.g., RADAR, LIDAR, optical cameras, etc.) to generate vehicle location data. In step 820, data center 18 receives the vehicle location data and performs the tint restriction data module 19 to identify if any window tint restrictions exist at the identified location of vehicle 12 (discussed above). In step 830, tint restriction data module 19 will produce a restriction output if any window tint restrictions exist at the location and send them to data center 18. Data center 18 will then transmit the tint restriction information from data module 19 to electronic processing device 38 (i.e., as at least part of the dimming information). In step 840, electronic processing device 38 will receive and analyze the dimming information to determine if a restriction output is present. Moreover, in this step, if processing device 38 determines a restriction output is present in the dimming information, then method 800 will move to step 850; otherwise, method 800 will move back to the beginning 801. In step 850, processing device 38 will generate a deactivation command to smart window 13. Processing device 38 will then transmit the deactivation command to each of the smart windows 13, which can be directly or by way of BCM 44. Upon completion of step 850, method 800 will move to completion 802.

It should be understood that this dimming information may be being provided to electronic processing device 38 by multiple vehicle components at one time. In essence, multiple methodologies discussed above may contribute to the dimming information being transmitted to processing device 38 and activation/deactivation may occur based on the outcome of any one of the contributing methodologies. For instance, processing device 38 may receive dimming information that includes both the vehicle environment temperature from thermometer 72 and a restriction output from data module 19, via data center 18. In such an instance, even if the received environment temperature exceeds the threshold temperature, activation of the smart windows 13 will not occur due to the existence of the restriction output. Skilled artists will understand that this is one configuration of dimming information and other configurations may exist. Skilled artisans will also see the outcome of one methodology may take precedent over the outcome of one or more of the other outcomes of the simultaneous methodologies for one or more reasons.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A system for an activation or deactivation of one or more electrochromic windows of a vehicle, the system comprising:
    a memory configured to comprise one or more executable instructions;

a controller configured to execute the executable instructions;
a vehicle comprising one or more electrochromic windows, wherein upon receiving an activation the one or more electrochromic windows will be in a dimmed state and upon receiving a deactivation the one or more electrochromic windows will be in a transparent state; and
wherein the executable instructions enable the controller to:
  receive dimming information;
  analyze the dimming information;
  based on the dimming information analysis, generate the activation or deactivation for at least one of the one or more electrochromic windows; and
  transmit the activation or deactivation to at least one of the one or more electrochromic windows;
a data center remotely located from the vehicle and remotely located from a tint restriction data module;
the tint restriction data module configured to produce window tint restriction data for a select location;
wherein the vehicle is further configured to generate vehicle location data, the vehicle is further configured to transmit the vehicle location data to the data center;
wherein, upon receiving the vehicle location data, the data center will:
  receive restriction output data, compressed in a binary form, from the tint restriction data module, to identify one or more window tint restrictions at the vehicle location; and
  based on the one or more window tint restrictions at the vehicle location, produce restriction output information;
wherein the dimming information is, at least in part, defined by the restriction output information and provided by the data center;
wherein the controller analyzes the dimming information to determine whether the restriction output information is present; and
wherein the controller will generate the deactivation when the restriction output information is present.

2. The system of claim 1, wherein the activation or deactivation is transmitted to the one or more electrochromic windows by way of a Body Control Module (BCM).

3. The system of claim 1, wherein the vehicle is an autonomous vehicle.

4. The system of claim 1, wherein the vehicle is an electric vehicle.

5. The system of claim 1, wherein:
the vehicle further comprises a thermometer configured to detect a temperature of a vehicle environment;
the dimming information is, at least in part, defined by the temperature of the vehicle environment and provided by the thermometer;
wherein the controller analyzes the dimming information to determine if the temperature exceeds a threshold temperature;
wherein the controller will generate the activation if the temperature exceeds the threshold temperature; and
wherein the controller will generate the deactivation if the temperature falls below the threshold temperature.

6. The system of claim 1, wherein:
the vehicle further comprises a seat weight sensor located in one or more vehicle seats, the seat weight sensor configured to provide vehicle seat occupancy information;
the dimming information is, at least in part, defined by the vehicle seat occupancy information and provided by the seat weight sensor;
wherein the controller analyzes the dimming information to determine whether one or more vehicle seats are adequately occupied; and
wherein the controller will generate the activation when one or more vehicle seats are occupied.

7. The system of claim 1, wherein:
the vehicle further comprises one or more collision sensors, the one or more collision sensors configured to provide vehicle collision information;
the dimming information is, at least in part, defined by the vehicle collision information and provided by the one or more collision sensors;
wherein the controller analyzes the dimming information to determine whether the vehicle has adequately encountered a vehicle collision event; and
wherein the controller will generate the deactivation if the vehicle has encountered the vehicle collision event.

8. The system of claim 1, further comprising:
a data center remotely located from the vehicle;
wherein the vehicle is further configured to wirelessly communicate with the data center;
the dimming information is, at least in part, defined by a remote activation request or remote deactivation request and provided by the data center;
wherein the controller analyzes the dimming information to determine whether a remote activation request or remote deactivation request is present;
wherein the controller will generate the activation when the remote activation request is present; and
wherein the controller will generate the deactivation when the remote deactivation request is present.

9. The system of claim 8, further comprising:
an emergency services dispatch center in communication with the data center; and
wherein the dispatch center causes the data center to produce the dimming information that is, at least in part, defined by the remote deactivation request.

10. A method for an activation or deactivation of one or more electrochromic windows of a vehicle, the method comprising:
(a) providing a memory configured to comprise one or more executable instructions;
(b) providing a controller configured to execute the executable instructions;
(c) providing a vehicle comprising one or more electrochromic windows, wherein upon receiving an activation the one or more electrochromic windows will be in a dimmed state and upon receiving a deactivation the one or more electrochromic windows will be in a transparent state;
(d) receiving, at the controller, dimming information;
(e) analyzing, via the controller, the dimming information;
(f) based on the dimming information analysis, via the controller, generating the activation or deactivation for at least one of the one or more electrochromic windows; and
(g) transmitting, via the controller, the activation or deactivation to at least one of the one or more electrochromic windows;
(h) providing a data center remotely located from the vehicle and remotely located from a tint restriction data module;

(i) providing the tint restriction data module configured to produce window tint restriction data for a select location;
wherein the vehicle is further configured to generate vehicle location data, the vehicle is further configured to transmit the vehicle location data to the data center;
(j) generating, via the vehicle, vehicle location data;
(k) transmitting, via the vehicle, the vehicle location data to the data center;
(l) receiving restriction output data, compressed in a binary form, from the tint restriction data module, to identify one or more window tint restrictions at the vehicle location and, based on the one or more window tint restrictions at the vehicle location, produce restriction output information;
wherein the dimming information is, at least in part, defined by the restriction output information and provided by the data center;
wherein step (e) is further defined by the controller determining whether the restriction output information is present; and
wherein step (f) is further defined by the controller generating the deactivation when the restriction output information is present.

11. The method of claim 10, further comprising:
wherein the activation or deactivation is transmitted to the one or more electrochromic windows by way of a Body Control Module (BCM); and
(h) causing, via the BCM, the activation or deactivation of the one or more electrochromic windows.

12. The method of claim 10, wherein the vehicle is an autonomous vehicle.

13. The method of claim 10, wherein the vehicle is an electric vehicle.

14. The method of claim 10, further comprising:
(h) providing a thermometer located at the vehicle, the thermometer configured to detect a temperature of a vehicle environment;
wherein the dimming information is, at least in part, defined by the temperature of the vehicle environment and provided by the thermometer;
wherein step (e) is further defined by the controller determining if the temperature exceeds or falls below a threshold temperature; and
wherein step (f) is further defined by the controller generating the activation if the temperature exceeds the threshold temperature and the controller generating the deactivation if the temperature falls below the threshold temperature.

15. The method of claim 10, further comprising:
(h) providing a seat weight sensor located in one or more vehicle seats, the seat weight sensor configured to provide vehicle seat occupancy information;
wherein the dimming information is, at least in part, defined by the vehicle seat occupancy information and provided by the seat weight sensor;
wherein step (e) is further defined by the controller determining whether the vehicle seat occupancy information is present; and
wherein step (f) is further defined by the controller generating the activation when one or more vehicle seats are occupied.

16. The method of claim 10, further comprising:
(h) providing one or more collision sensors located around the vehicle, the one or more collision sensors configured to provide vehicle collision information;
wherein the dimming information is, at least in part, defined by the vehicle collision information and provided by the one or more collision sensors;
wherein step (e) is further defined by the controller determining whether the vehicle collision information is present; and
wherein step (f) is further defined by the controller generating the deactivation if the vehicle has encountered the vehicle collision event.

17. The method of claim 10, further comprising:
(h) providing a data center remotely located from the vehicle;
wherein the vehicle is further configured to be in communication with the data center;
wherein the dimming information is, at least in part, defined by a remote activation request or remote deactivation request and provided by the data center;
wherein step (e) is further defined by the controller determining whether a remote activation request or remote deactivation request is present; and
wherein step (f) is further defined by the controller generating the activation when the remote activation request is present and deactivation when the remote deactivation request is present.

18. The method of claim 17, further comprising:
(i) providing an emergency services dispatch center in communication with the data center; and
(j) causing, via the emergency services dispatch center, the data center to produce the dimming information that is, at least in part, defined by the remote deactivation request.

* * * * *